United States Patent
Kawasaki

(10) Patent No.: US 10,006,776 B2
(45) Date of Patent: Jun. 26, 2018

(54) ROUTE SEARCHING SYSTEM, STORAGE MEDIUM WHICH STORES ROUTE SEARCHING PROGRAM, AND ROUTE SEARCHING METHOD

(71) Applicant: HONDA MOTOR CO., LTD., Tokyo (JP)

(72) Inventor: Shunsuke Kawasaki, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 8 days.

(21) Appl. No.: 15/384,878

(22) Filed: Dec. 20, 2016

(65) Prior Publication Data

US 2017/0176197 A1    Jun. 22, 2017

(30) Foreign Application Priority Data

Dec. 22, 2015  (JP) ................................. 2015-250672

(51) Int. Cl.
  *G01C 21/26* (2006.01)
  *G01C 21/34* (2006.01)

(52) U.S. Cl.
  CPC ......... *G01C 21/3446* (2013.01); *G01C 21/26* (2013.01); *G01C 21/34* (2013.01); *G01C 21/3461* (2013.01)

(58) Field of Classification Search
  CPC ........ G01C 21/00; G01C 21/26; G01C 21/34; G01C 21/3446; G01C 21/3461
  See application file for complete search history.

(56) References Cited

U.S. PATENT DOCUMENTS

| 6,347,280 | B1* | 2/2002 | Inoue | G01C 21/3626 340/910 |
| 6,760,662 | B2* | 7/2004 | Lee | G01C 21/3655 340/995.21 |
| 6,928,365 | B2* | 8/2005 | Sakai | G01C 21/3626 340/995.2 |
| 8,738,289 | B2* | 5/2014 | Ghoting | G08G 1/202 701/400 |
| 9,857,188 | B1* | 1/2018 | O'Hare | G01C 21/3453 |
| 2001/0027377 | A1* | 10/2001 | Shimabara | G01C 21/3658 701/437 |
| 2002/0032523 | A1* | 3/2002 | Sakashita | G01C 21/34 701/443 |
| 2002/0165667 | A1* | 11/2002 | Lee | G01C 21/3655 701/431 |
| 2003/0216858 | A1* | 11/2003 | Sakai | G01C 21/3626 701/428 |

FOREIGN PATENT DOCUMENTS

JP    2015-145793 A    8/2015

* cited by examiner

*Primary Examiner* — Yonel Beaulieu
(74) *Attorney, Agent, or Firm* — Squire Patton Boggs (US) LLP

(57) ABSTRACT

A route searching system is provided that can appropriately search for a route even when a movement restriction is individually set. In a case where a movement condition is satisfied, the route searching system refers to movement restriction information and searches for a recommended route based on the map information so as to exclude a route that violates the movement restriction. In a case where the movement condition is not satisfied, the route searching system searches for a recommended route based on map information including a route that violates the movement restriction.

10 Claims, 7 Drawing Sheets

FIG. 2A

| USER IDENTIFIER | ORGANIZATION IDENTIFIER |
|---|---|
| AAA | DDD |
| BBB | EEE |
| CCC | FFF |

| ORGANIZATION IDENTIFIER | DAY | TIME PERIOD | MOVEMENT RESTRICTION REGION |
|---|---|---|---|
| DDD | MONDAY, TUESDAY, WEDNESDAY, THURSDAY, FRIDAY | H1:M1:S1~H2:M2:S2 | L1,L2,L3... |
| EEE | SATURDAY | H3:M3:S3~H4:M4:S4 | L4,L5,L6... |
| FFF | MONDAY, TUESDAY, WEDNESDAY | H5:M5:S5~H6:M6:S6 | L7,L8,L9... |

| ORGANIZATION IDENTIFIER | DAY | TIME PERIOD | LOCATION | DRIVING MODE |
|---|---|---|---|---|
| DDD | MONDAY, TUESDAY, WEDNESDAY, THURSDAY, FRIDAY | H7:M7:S7~H8:M8:S8 | P1 | NO RIGHT TURN |
| EEE | SATURDAY | H9:M9:S9~H10:M10:S10 | P2 | NO U TURN |
| FFF | MONDAY, TUESDAY, WEDNESDAY | H11:M11:S11~H12:M12:S12 | P3 | LEFT TURN ALLOWED |

143

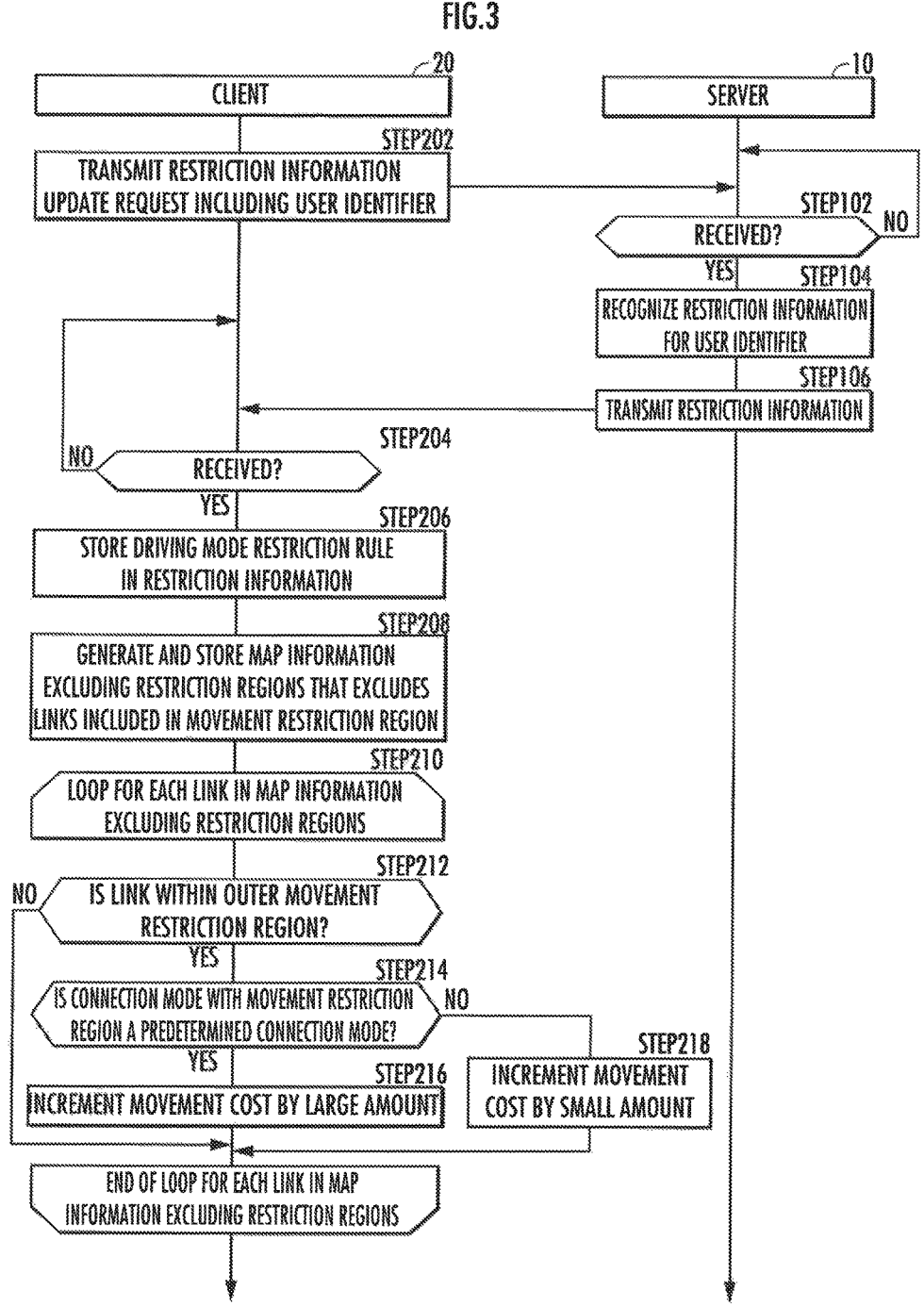

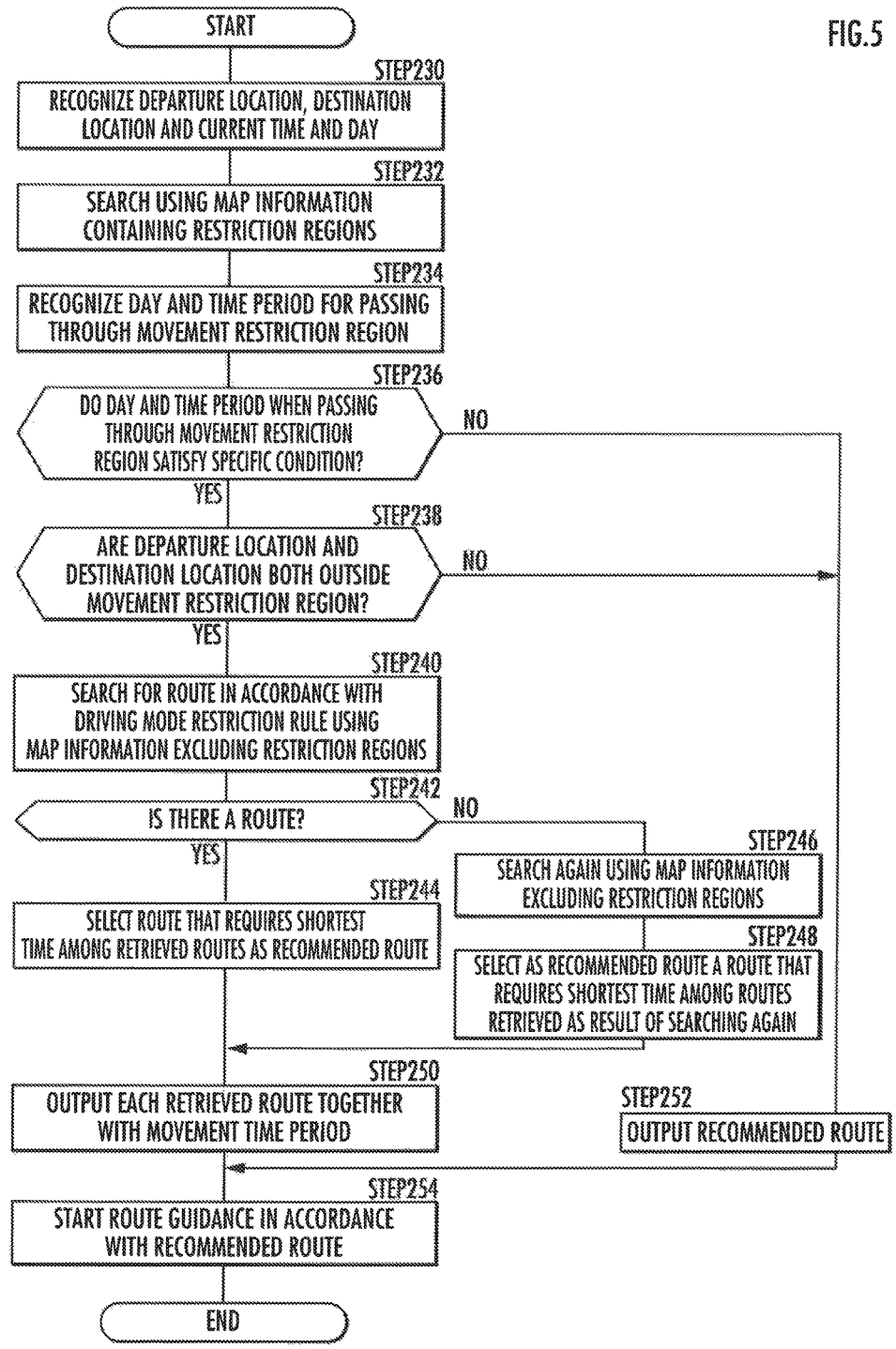

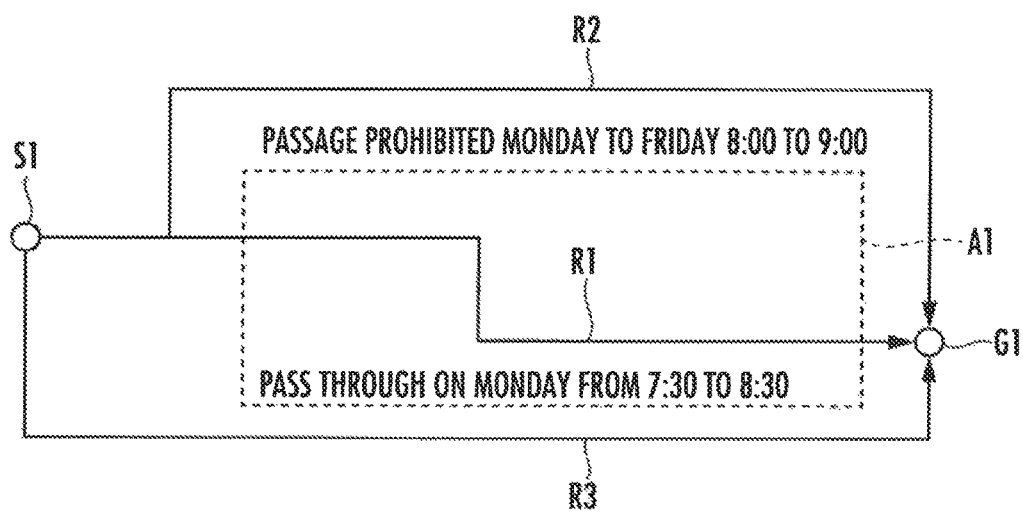
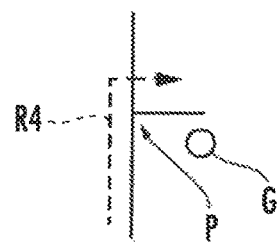

ROUTE SEARCHING SYSTEM, STORAGE MEDIUM WHICH STORES ROUTE SEARCHING PROGRAM, AND ROUTE SEARCHING METHOD

BACKGROUND OF THE INVENTION

Field of the Invention

The present invention relates to a route searching system, a storage medium which stores a route searching program, and a route searching method.

Description of the Related Art

Conventionally, as a route searching system, an apparatus is known which searches for a route by dividing a rectangular area which contains a passage-prohibited zone into a plurality of divided ranges based on passage-prohibited zone data, determining whether or not the respective divided ranges overlap with the passage-prohibited zone, and excluding roads or the like included in regions corresponding to divided ranges that are determined as overlapping with the passage-prohibited zone from search candidates (for example, see Japanese Patent Laid-Open No. 2015-145793).

However, according to the technology described in Japanese Patent Laid-Open No. 2015-145793, it is not possible to appropriately meet the need of an individual or organization that wishes to independently set a restriction on movement of movable body.

For example, in some cases, in an organization such as a business, restrictions are imposed on the members of the organization to prevent traffic congestion or the like occurring in the vicinity of the organization's base. An example of such a restriction is setting a movement restriction region or the like to restrict the movement of a movable body in a geographical region of a fixed range that exists in the vicinity of the organization's base during a traffic restriction time period that is a predetermined time period.

However, according to the technology disclosed in Japanese Patent Laid-Open No. 2015-145793, there is a concern that it will not be possible to adequately search for a route if a route is searched for when the aforementioned movement restriction region is adopted as a passage-prohibited zone.

For example, in a case where a movable body moves into the movement restriction region at a time that is outside the relevant traffic restriction time period, and departs from the movement restriction region during the traffic restriction time period, or in a case where a movable body must move to the movement restriction region during the traffic restriction time period, there is a risk that a route will not be retrieved if a route is searched for in a manner that excludes roads that are included in the movement restriction region.

An object of the present invention is to provide a route searching system, a storage medium that stores a route searching program, and a route searching method which are capable of appropriately searching for a route even in a case where a movement restriction is individually set.

SUMMARY OF THE INVENTION

A route searching system of the present invention is a route searching system which searches for a recommended route of a movable body, comprising:

a storage unit configured to store map information represented by a plurality of links and movement restriction information relating to restriction of movement of the movable body;

a location recognition unit configured to recognize a departure location and a destination location of the movable body; and a route searching unit configured to determine whether or not a movement condition which is that it is possible for the movable body to move from the departure location to the destination location by moving in accordance with the movement restriction information is satisfied, and in a case where the movement condition is satisfied, to refer to the movement restriction information and search for a recommended route based on the map information so as to exclude a route that violates the movement restriction, and in a case where the movement condition is not satisfied, to search for the recommended route based on the map information including a route that violates the movement restriction.

According to the route searching system having the above described configuration, in a case where the movement condition is satisfied, the route searching unit refers to the movement restriction information and searches for a recommended route in a manner that excludes a route that violates a movement restriction. By this means, in a case where it is possible for the movable body to move from the departure location to the destination location in accordance with the movement restriction, a recommended route that avoids a route that violates the movement restriction is searched for.

In contrast, in a case where the movement condition is not satisfied, the route searching unit searches for a recommended route based on map information that includes a link included in the movement restriction region. By this means, in a case where it is not possible for the movable body to move from the departure location to the destination location in accordance with the movement restriction, that is, in a case where the movable body cannot move from the departure location to the destination location without passing along a route on which the movable body violates the movement restriction, a recommended route is searched for that includes a route that violates the movement restriction.

Thus, according to the route searching system having the above described configuration, whether or not to avoid a route that violates a movement restriction is determined in accordance with the departure location and the destination location of the movable body, and hence it is possible to appropriately search for a route.

In the route searching system of the present invention, preferably the storage unit is configured to store, as the movement restriction information, movement restriction region information relating to a movement restriction region that is a geographical region in which movement of the movable body is restricted; and the route searching unit is configured to determine whether or not, as the movement condition, an extra-region movement condition which is that it is possible for the movable body to move from the departure location to the destination location by passing along only links that are outside the movement restriction region is satisfied, and in a case where the extra-region movement condition is satisfied, to refer to the movement restriction region information and search for the recommended route based on the map information so as to exclude a link that is included in the movement restriction region, and in a case where the extra-region movement condition is not satisfied, to search for the recommended route based on the map information including a link included in the movement restriction region.

According to the route searching system having the above described configuration, in a case where the extra-region movement condition is satisfied, the route searching unit refers to the movement restriction information and searches for a recommended route in a manner that excludes a link included in the movement restriction region. By this means, in a case where it is possible for the movable body to move from the departure location to the destination location by passing along only links that are outside the movement restriction region, a recommended route that avoids the movement restriction region is searched for.

In contrast, in a case where the extra-region movement condition is not satisfied, the route searching unit searches for a recommended route based on map information that includes a link included in the movement restriction region. By this means, in a case where it is not possible for the movable body to move from the departure location to the destination location by passing along only links that are outside the movement restriction region, that is, in a case where the movable body cannot move from the departure location to the destination location without passing along a link that is within the movement restriction region, a recommended route that does not avoid the movement restriction region is searched for.

Thus, according to the route searching system having the above described configuration, whether or not to avoid a movement restriction region is determined in accordance with the departure location and the destination location of the movable body, and hence it is possible to appropriately search for a route.

In the route searching system of the present invention, preferably:

the storage unit stores, as the map information, map information excluding restriction regions from which a link included in a movement restriction region is excluded, and map information containing restriction regions that includes a link included in a movement restriction region as the map information and the movement restriction region information; and in a case where the extra-region movement condition is satisfied, the route searching unit searches for the recommended route based on the map information excluding restriction regions so as to exclude a link included in the movement restriction region, and in a case where the extra-region movement condition is not satisfied, the route searching unit searches for the recommended route based on the map information containing restriction regions so as to include a link included in the movement restriction region.

According to the route searching system having the above described configuration, when searching for a recommended route in a manner so as to exclude a link included in a movement restriction region, since map information excluding restriction regions from which a link included in a movement restriction region is excluded that is stored in the storage unit is used, the amount of calculation is reduced and, furthermore, a link included in a movement restriction region is reliably excluded from the recommended route.

In the route searching system of the present invention, preferably, the route searching unit is configured to search for a recommended route in a manner that prioritizes satisfaction of the extra-region movement condition over other movement conditions.

According to the route searching system having the above described configuration, even in a case where there are a plurality of movement restrictions, satisfaction of the extra-region movement condition is prioritized over the other movement restrictions. As a result, movement through a movement restriction region is avoided. By this means, since a movement time period in which any movement restriction is violated is comparatively shortened, an uncomfortable feeling that is imparted to an occupant of the movable body is lessened.

In the route searching system of the present invention, preferably:

in a case where one or both of the departure location and the destination location are included in a movement restriction region, the route searching unit determines that the extra-region movement condition is not satisfied.

According to the route searching system having the above described configuration, in a case where it is clear that the extra-region movement condition is not satisfied, such as when one or both of the departure location and the destination location are included in a movement restriction region, without performing a route search operation it is determined that the extra-region movement condition is not satisfied. By this means, a calculation amount when making a determination regarding an extra-region movement condition can be reduced.

In the route searching system of the present invention, preferably:

the storage unit stores an outer movement restriction region that is geographically adjacent to the movement restriction region, and the route searching unit evaluates a movement cost for a link included in the outer movement restriction region so as to be greater than in a case where the link is not included in the outer movement restriction region.

According to the route searching system having the above described configuration, a movement cost for a link included in the outer movement restriction region is evaluated so as to be greater in comparison to a case where the link is not included in the outer movement restriction region. By this means, it becomes difficult for a link included in an outer movement restriction region, that is, a link included in a region that is geographically adjacent to a movement restriction region, to be included in a recommended route. In other words, the probability that a link included in a recommended route is a link in a region that is geographically separated from a movement restriction region increases.

Accordingly, in a case where a movable body moves along a recommended route, since there is a high probability that the movable body is moving through a region that is geographically separated from a movement restriction region, even if the driver of the movable body drives in a manner that deviates from the recommended route, the probability that the movable body will enter the movement restriction region is low.

As a result, even if the driver of the movable body does not follow the recommended route, the probability that the movable body will move in a manner that avoids the movement restriction region is high.

In the route searching system having the above described configuration, preferably:

the route searching unit evaluates a movement cost of a link that is included in the outer movement restriction region and is connected in a predetermined connection mode to the movement restriction region so as to be greater than in a case where the link that is included in the outer movement restriction region is not connected in the predetermined connection mode.

According to the route searching system having the above described configuration, since it becomes difficult for a link that is connected in a predetermined connection mode to be retrieved, by appropriately setting a predetermined connection mode, it become difficult for a link that, for example, is liable to enter a movement restriction region to be retrieved.

In the route searching system of the present invention, preferably:

the storage unit is configured to store, as the movement restriction information, a driving mode restriction rule which restricts a predetermined driving mode by a driver of the movable body at a predetermined location; and the route searching unit is configured to determine whether or not, as the movement condition, a rule movement condition which is that it is possible for the movable body to move from the departure location to the destination location by moving in accordance with the driving mode restriction rule is satisfied, and in a case where the rule movement condition is satisfied, to refer to the driving mode restriction rule and search for the recommended route based on the map information so as to exclude a route that violates the driving mode restriction rule, and in a case where the rule movement condition is not satisfied, to search for the recommended route based on the map information including a route that violates the driving mode restriction rule.

According to the route searching system having the above described configuration, a recommended route is searched for in a manner that excludes a predetermined driving mode by the driver of the movable body at a predetermined location. Consequently, setting of more flexible restrictions is possible.

BRIEF DESCRIPTION OF THE DRAWINGS

FIG. 2A is a view illustrating a user organization correspondence table;

FIG. 2B is a view illustrating a restriction region information table 142;

FIG. 2C is a view illustrating a restriction rule table;

FIG. 3 is a flowchart of map information update processing according to one embodiment of the present invention;

FIG. 5 is a flowchart of route search processing according to one embodiment of the present invention;

FIG. 6A is an explanatory diagram of a route that passes inside and outside a movement restriction region;

FIG. 6B is an explanatory diagram of a route on which a specific driving mode must be adopted;

DETAILED DESCRIPTION OF THE PREFERRED EMBODIMENTS

An embodiment of the route searching system of the present invention will now be described referring to FIG. 1 to FIG. 7.

(Configuration of Route Searching System)

Figure 1:
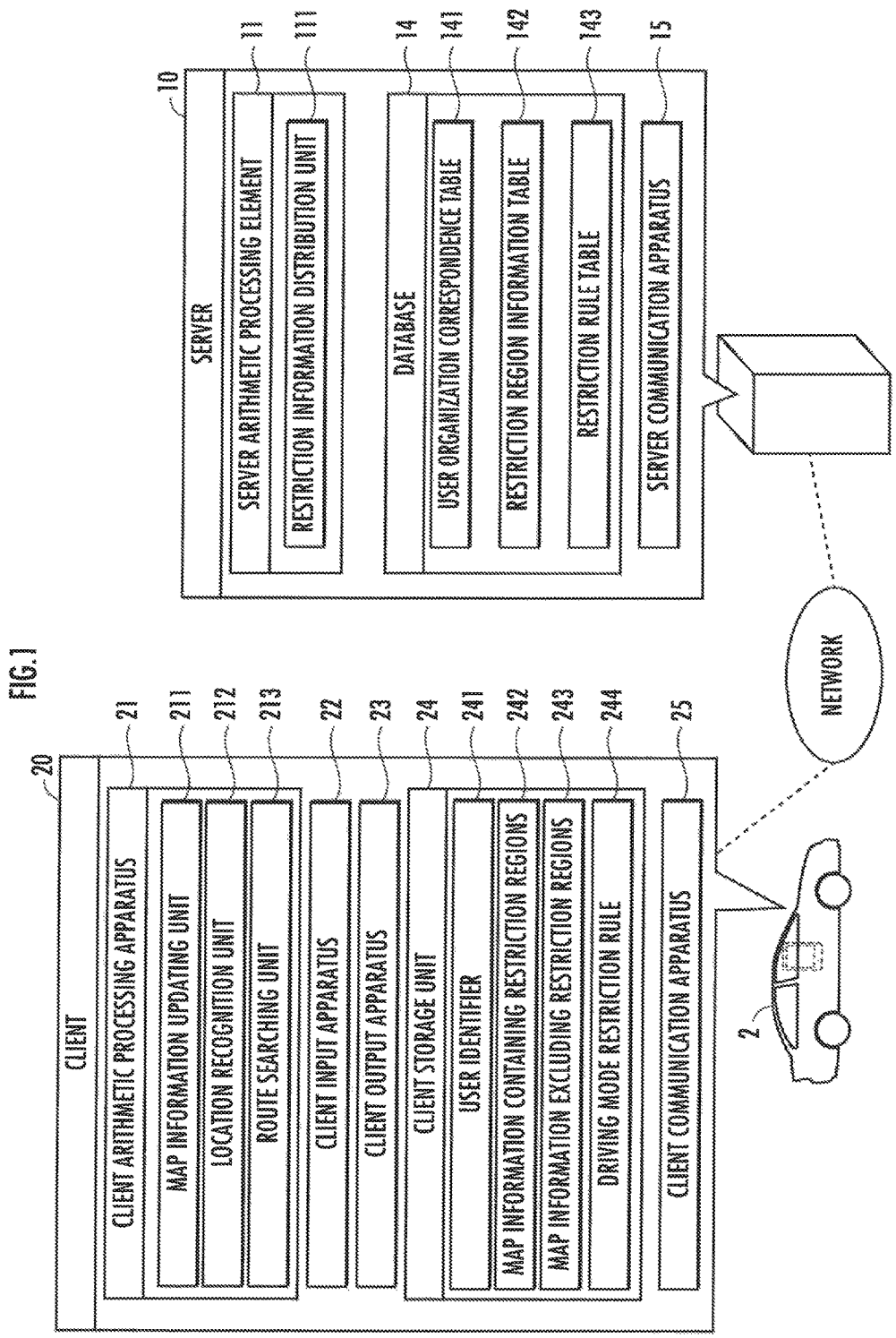
FIG. 1 is an overall configuration diagram of a route searching system according to one embodiment of the present invention.

As shown in FIG. 1, the route searching system comprises a server 10 and a client 20 which is mounted in a movable body 2. The server 10 and the client 20 are connected to each other through a network.

(Configuration of Server)

The server 10 comprise-s a server arithmetic processing element 11, a database 14 and a server communication apparatus 15. Note that some or all of a computer constituting the server 1 may be constituted by a computer constituting the client 20. For example, some or all of the server 10 may be constituted by one or a plurality of the client 20 as a mobile station.

The server arithmetic processing element 11 is constituted, for example, by a processor such as a CPU. The server arithmetic processing element 11 functions as a restriction information distribution unit 111 that executes arithmetic processing, described later, by executing a predetermined program that is read from a memory or a storage device such as a hard disk. The server arithmetic processing element 11 may be constituted by a single processor or may be constituted by a plurality of processors that are capable of communicating with each other.

The database 14 is constituted by a storage device, for example, a ROM (Read Only Memory), a RAM (Random Access Memory) or a HDD (Hard Disk Drive). The database 14 is configured to store results of calculations of the server arithmetic processing element 11 and data that the server arithmetic processing element 11 received via the server communication apparatus 15.

The database 14 stores a user organization correspondence table 141 (see FIG. 2A), a restriction region information table 142 (see FIG. 2B) and a restriction rule table 143 (see FIG. 2C).

As shown in FIG. 2A, the user organization correspondence table 141 is a table that associates user identifiers (see "user identifier column 1411") that are identifiers of users and organization identifiers (see "organization identifier column 1412") that are identifiers of organizations to which the respective users belong.

As shown in FIG. 2B, the restriction region information table 142 is a table that associates respective organization identifiers (see "organization identifier column 1421"), days that are restriction objects (see "day column 1422"), time periods that are restriction objects (see "time period column 1423") and movement restriction regions (see "movement restriction region column 1424"). A movement restriction region is, for example, represented by links L1, L2, L3 . . . on which movement of a movable body is restricted.

As shown in FIG. 2C, the restriction rule table 143 is a table that associates respective organization identifiers (see "organization identifier column 1431"), days that are restriction objects (see "day column 1432"), time periods that are restriction objects (see "time period column 1433"), locations that are restriction objects (see "location column 1434") and driving modes that are restriction objects (see "driving mode column 1435"). The locations that are restriction objects are, for example, represented by location information P1, P2, P3 . . . that are represented by a latitude and a longitude. The driving modes that are restriction objects are represented by prohibited driving modes or allowed driving modes, for example, "no right turn", "no U turn" or "left turn allowed".

The server communication apparatus 15 is constituted by a communication apparatus that is connected to a public communication network (for example, the Internet) as a network, and communicates with an external terminal (for example, the client 20).

(Configuration of Client)

The client 20 is constituted by an information terminal (for example, a cellular telephone) that is designed to have a size, shape and weight such that the information terminal can be carried by a user, such as a tablet-type terminal or a smartphone. The client 20 may also be an information terminal (for example, a navigation apparatus) designed to have a size and the like such that the information terminal can be mounted in the movable body 2 in which the user of the client 20 is riding. Further, for example, the client 20 may be constituted by co-operation between a plurality of information terminals that have different functions to each other, such as a cellular telephone communication function having a communication function and a navigation apparatus having an input function and an output function.

The client 20 comprises a client arithmetic processing apparatus 21, a client input apparatus 22, a client output apparatus 23, a client storage unit 24 and a client communication apparatus 25.

The client arithmetic processing apparatus 21 is constituted by a processor such as a CPU. A route search application that performs an operation to search for a route is installed in the client arithmetic processing apparatus 21. The client arithmetic processing apparatus 21 is configured to function as a map information updating unit 211, a location recognition unit 212 and a route searching unit 213 that execute arithmetic processing that is described later, by activating the route search application. The client arithmetic processing apparatus 21 may be constituted by a single processor or may be constituted by a plurality of processors that are capable of communicating with each other.

The client arithmetic processing apparatus 21 fulfills a function as a user interface manager (UIM) that adjusts display contents on a touch panel and the like in accordance with different types of touch gestures made by the user on the touch panel. The touch gestures include taps (a single tap, a double tap and a long tap), flicks (an upward flick, a downward flick, a left flick and a right flick), swipes and pinches (pinch-in and pinch-out) and multi-touching and the like.

The client input apparatus 22 is constituted by a locator apparatus such as a touch pad, the client output apparatus 23 is constituted by a display apparatus such as a liquid crystal panel, and both apparatuses are combined to constitute a touch panel. That is, the touch panel can function as an input interface and an output interface, respectively. Function images that are in accordance with functions of applications (software applications) installed in the client 20 are displayed on the touch panel.

The client input apparatus 22 may also be constituted by, alternatively or additionally, a detection apparatus which detects the form of a non-contact type input operation (speech content or a gesture) of the user, such as an input operation using an audio input apparatus (microphone) or an imaging apparatus. The client output apparatus 23 may also be additionally constituted by an audio output apparatus (speaker). In a case where the client input apparatus 22 is an imaging apparatus or the like that can recognize a non-contact type gesture (a movement of an expression, or a movement of a body part such as a fingertip or arm) of a user, it is possible for the form of the gesture to be detected by the client arithmetic processing apparatus 21 as the form of an input operation.

The client storage unit 24 is constituted by a storage device such as a ROM (read only memory), a RAM (random access memory) or a HDD (hard disk drive). A user identifier 241, map information containing restriction regions 242, map information excluding restriction regions 243 and a driving mode restriction rule 244 are stored in the client storage unit 24. The client storage unit 24 of the present embodiment corresponds to a "storage unit" of the present invention.

The user identifier 241 is an identifier of a user of the movable body 2 that is input through the client input apparatus 22 in advance or when the route search application is activated.

The map information containing restriction regions 242 is general map information that includes a plurality of links (map information including links included in a movement restriction region through which passage is restricted by the organization to which the user of the movable body 2 belongs).

The map information excluding restriction regions 243 is map information which is updated by map information update processing that is described later, and which does not include links included in a movement restriction region through which passage is restricted by the organization to which the user of the movable body 2 belongs.

The driving mode restriction rule 244 is a rule that is updated by the map information update processing that is described later, and is a rule for restricting a predetermined driving mode in a predetermined time period and a predetermined location. For example, the driving mode restriction rule 244 is a rule that a right turn is prohibited at XXX intersection between 7:00 am and 9:00 am on weekdays.

The client communication apparatus 25 is configured to intercommunicate with an external terminal such as the server 10 through a public communication network (for example, the Internet) as a network in accordance with a communication standard that is suitable for long-range radio communication, such as WiFi (registered trademark).

The client 20 is connected to the movable body 2, and is configured to be capable of receiving positional information that is measured by a measurement apparatus such as a GPS from the movable body 2. Instead of or in addition thereto, the client 20 may have a self-position measurement function that is realized by utilizing a GPS or the like.

(Map Information Update Processing)

Next, map information update processing that is executed at fixed time intervals (for example, intervals of 24 hours) will be described referring to FIG. 3 to FIG. 4.

The map information updating unit 211 recognizes the user identifier 241 by referring to the client storage unit 24, and transmits a restriction information update request that includes the relevant user identifier 241 to the server 10 through the client communication apparatus 25 (FIG. 3/STEP 202).

The restriction information distribution unit 111 determines whether or not a restriction information update request was received through the server communication apparatus 15 (FIG. 3/STEP 102).

If the result of the aforementioned determination is negative ("No" in FIG. 3/STEP 102), the restriction information distribution unit 111 executes the processing in FIG. 3/STEP 102 once again.

If the aforementioned determination result is affirmative ("Yes" in FIG. 3/STEP 102), the restriction information distribution unit 111 recognizes restriction information corresponding to the user identifier 241 included in the restriction information update request that is received (FIG. 3/STEP 104).

Note that the term "recognizes" as used when describing that one apparatus "recognizes" information means that all arithmetic processing necessary for acquiring the information in question is executed, such as one apparatus deriving the information by executing predetermined arithmetic processing on a measured result, one apparatus receiving the information from another apparatus, one apparatus deriving the information by executing predetermined arithmetic processing (computational processing or search processing or the like) that takes a signal received from another apparatus as an object, one apparatus receiving the information from another apparatus as a result of arithmetic processing by the other apparatus, and one apparatus reading the information from an internal storage device or an external storage device in accordance with the received signal.

For example, the restriction information distribution unit 111 recognizes an organization identifier corresponding to the user identifier 241 by referring to the user organization correspondence table 141. Subsequently, by referring to the restriction region information table 142, the restriction information distribution unit 111 recognizes a time period that is a restriction object and a movement restriction region that correspond to the organization identifier as restriction information. Further, by referring to the restriction rule table 143, the restriction information distribution unit 111 recognizes a time period that is a restriction object, a location that is a restriction object and a driving mode that is a restriction object as restriction information that correspond to the organization identifier.

The restriction information distribution unit 111 transmits the recognized restriction information to the client 20 through the server communication apparatus 15 (FIG. 3/STEP 106).

The map information updating unit 211 determines whether or not restriction information was received (FIG. 3/STEP 204).

If the result of the aforementioned determination is negative ("No" in FIG. 3/STEP 204), the map information updating unit 211 executes the processing in FIG. 3/STEP 204 once again.

If the aforementioned determination result is affirmative ("Yes" in FIG. 3/STEP 204), the map information updating unit 211 stores the driving mode restriction rule 244 that is included in the received restriction information (FIG. 3/STEP 206).

The map information updating unit 211 generates the map information excluding restriction regions 243 that excludes a link included in the movement restriction region that is included in the restriction information, and stores the map information excluding restriction regions 243 in the client storage unit 24 (FIG. 3/STEP 208). If a plurality of movement restriction regions exist, the map information updating unit 211 generates the map information excluding restriction regions 243 for each day and time period corresponding to the relevant movement restriction regions.

For example, the map information updating unit 211 recognizes a region having a predetermined shape (for example, a rectangle) geographically that includes each link included in the movement restriction region information as a movement restriction region. More specifically, in a map illustrated in FIG. 4, in a case where links L11, L12 and L13 are included in the movement restriction region information, the map information updating unit 211 recognizes a smallest rectangular area that includes the links L11, L12 and L13 (the area surrounded by a dashed line in FIG. 4).

Further, in addition to the links L11, L12 and L13, the map information updating unit 211 recognizes links L14, L15 . . . and the like that are included in the rectangular area as links to be excluded.

The map information updating unit 211 generates the map information excluding restriction regions 243 based on the map information containing restriction regions 242 by excluding the links to be excluded.

The map information updating unit 211 stores the generated map information excluding restriction regions 243 in the client storage unit 24.

The map information updating unit 211 performs a loop operation to execute processing from FIG. 3/STEP 212 to FIG. 3/STEP 218 with respect to each link included in the map information excluding restriction regions 243 (FIG. 3/STEP 210).

In FIG. 3/STEP 212, the map information updating unit 211 determines whether or not a link that is a processing object is a link within an outer movement restriction region (FIG. 3/STEP 212).

Figure 4:
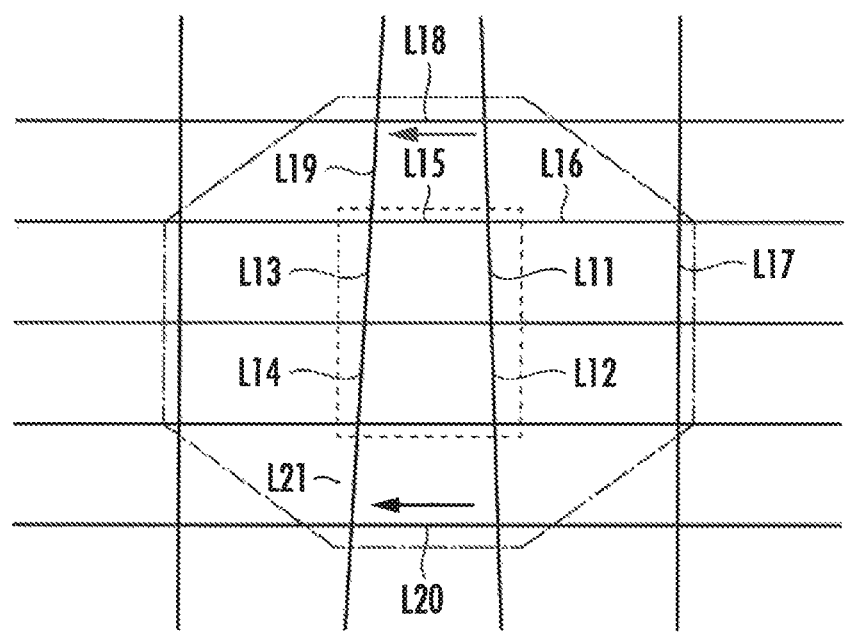
FIG. 4 is a view illustrating a method for updating respective links in the map information update processing illustrated in FIG. 3.

In this case, the term "outer movement restriction region" refers to a region that is adjacent to the movement restriction region (region surrounded by a dashed line in FIG. 4), as in the case of the region surrounded by an alternate long and short dash line in FIG. 4. The region that is adjacent to the movement restriction region is a region that includes minimum links surrounding the movement restriction region, for example, includes a link L17 surrounding the movement restriction region, in addition to a link L16 that is directly connected to a link included in the movement restriction region.

If the result of the determination in FIG. 3/STEP 212 is negative ("No" in FIG. 3/STEP 212), the map information updating unit 211 executes processing for the next loop.

If the result of the determination in FIG. 3/STEP 212 is affirmative ("Yes" in FIG. 3/STEP 212), the map information updating unit 211 determines whether or not a link that is a processing object is connected in a predetermined connection mode to the movement restriction region (FIG. 3/STEP 214).

In this case, the following (1) to (5) may be mentioned as examples of "a link that is a processing object is connected in a predetermined connection mode to the movement restriction region".

(1) A case where the link that is a processing object is directly connected to a link included in the movement restriction region.

For example, in FIG. 4, in a case where the link that is the processing object is the link L16, the link L16 that is the processing object corresponds to (1).

(2) A case where an angle formed by (a vector defined by) the link that is the processing object and (a vector defined by) a link that is directly connected to a link included in the movement restriction region is equal to or greater than a predetermined angle.

For example, in FIG. 4, when an angle formed by a link L18 that is a processing object and a link L19 that is directly connected to a link included in the movement restriction region is equal to or greater than a predetermined angle (90 degrees), the link L18 that is the processing object corresponds to (2).

On the other hand, in FIG. 4, if an angle formed by a link L20 that is a processing object and a link L21 that is directly connected to a link included in the movement restriction region is less than the predetermined angle (90 degrees), the link L20 that is the processing object does not correspond to (2).

(3) A case where the link that is a processing object is connected in a manner such that a movable body moves in a predetermined driving mode (for example, makes a left turn in a case where the movable body drives on the left-hand side) with respect to a link that is directly connected to a link included in the movement restriction region.

For example, in FIG. 4, in a case where, by making a left turn left, a movable body can move from the link L18 as the processing object to the link L19 that is directly connected to a link included in the movement restriction region, the link L18 that is the processing object corresponds to (3).

On the other hand, in FIG. 4 in a case where, by making a left turn left, a movable body cannot move from a link L20 as the processing object to a link L21 that is directly connected to a link included in the movement restriction region, the link L20 that is the processing object does not correspond to (3).

(4) A case where a distance from the link that is a processing object to a link included in the movement restriction region is less than a predetermined distance.

(5) A case where a predetermined facility that is easy to stop off at which has been registered in advance exists between the link that is a processing object and a link included in the movement restriction region.

For example, in a case where a facility that is easy to stop off at such as a service station or a convenience store which has been registered in advance exists between the link that is the processing object and a link included in the movement restriction region, the link that is the processing object corresponds to (5).

If the result of the determination in FIG. 3/STEP 214 is affirmative ("Yes" in FIG. 3/STEP 214), the map information updating unit 211 adds a predetermined cost increment to a movement cost of the link that is a processing object (FIG. 3/STEP 216).

If the result of the determination in FIG. 3/STEP 214 is negative ("No" in FIG. 3/STEP 214), the map information updating unit 211 adds a predetermined cost increment that is less than the cost increment in FIG. 3/STEP 216 to the movement cost of the link that is a processing object (FIG. 3/STEP 218).

After FIG. 3/STEP 216 or FIG. 3/STEP 218, the map information updating unit 211 executes processing for the next loop.

By performing the above processing, the map information excluding restriction regions 243 and the driving mode restriction rule 244 are updated.

(Route Search Processing)

Next, route search processing will be described referring to FIG. 5 to FIG. 7.

The location recognition unit 212 recognizes a departure location of the movable body 2, a destination location of the movable body 2, and the current time of day and current day (FIG. 5/STEP 230). For example, the location recognition unit 212 recognizes a location that is measured by a measurement apparatus of the movable body 2 as the departure location of the movable body 2. The location recognition unit 212 also recognizes a location that was specified through the client input apparatus 22, as the destination location of the movable body 2. Further, the location recognition unit 212 recognizes the current time of day and current day through a timer function of the client 20 or through communication with the server 10.

The route searching unit 213 uses a map containing restriction regions to search for a route that joins the departure location of the movable body 2 and the destination location of the movable body 2 (FIG. 5/STEP 232).

The route searching unit 213 recognizes a day and a time period of passing through any movement restriction region on the route that was retrieved by the aforementioned search in STEP 232 (FIG. 5/STEP 234).

For example, as shown in FIG. 6A, on a route R1 that is retrieved in FIG. 5/STEP 232, based on a time required to reach a movement restriction region A1 and the current day and time of day, the route searching unit 213 recognizes a day "Monday" and a time period "7:30 to 8:30" when the movable body 2 will pass through the movement restriction region A1.

The route searching unit 213 determines whether or not (whether or not a specific condition is satisfied) the day and time period when the movable body 2 will pass through the relevant movement restriction region overlaps with a day and time period that is a restriction object for the relevant movement restriction region (FIG. 5/STEP 236).

For example, the route searching unit 213 determines whether or not, as shown in FIG. 6A, the day "Monday" and the time period "7:30 to 8:30" when the movable body 2 will pass through the movement restriction region A1 overlap with the days "Monday" to "Friday" and the time period "8:00 to 9:00" that are the restriction objects of the movement restriction region. In this case, because the day "Monday" and the time period "7:30 to 8:30" when the movable body 2 will pass through the movement restriction region A1 overlap with the days "Monday" to "Friday" and the time period "8:00 to 9:00" that are the restriction objects of the movement restriction region A1, the result of the determination in FIG. 5/STEP 236 is affirmative.

Figure 7A:
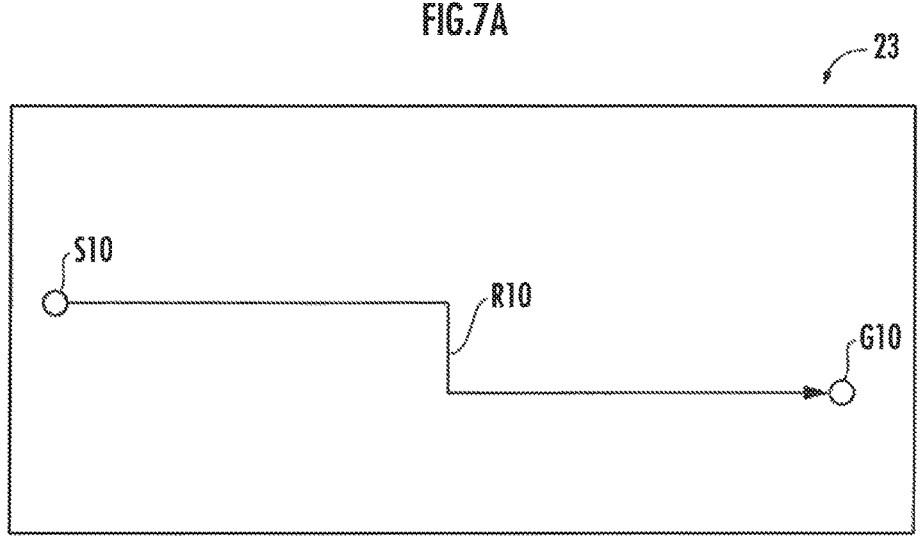
FIG. 7A is a view for describing a route in a case where it is necessary to pass within a movement restriction region.

In a case where the result of the determination in FIG. 5/STEP 236 is negative ("No" in FIG. 5/STEP 236), the route searching unit 213 outputs the retrieved route to the client output apparatus 23 as a recommended route (FIG. 5/STEP 252), and starts route guidance in accordance with the recommended route (FIG. 5/STEP 254). For example, as shown in FIG. 7A, the route searching unit 213 displays, on the client output apparatus 23, an image in which a recommended route R10 that joins a departure location S10 and a destination location G10 is superimposed on a map, and executes route guidance of the movable body 2 in accordance with the recommended route R10.

If the result of the determination in FIG. 5/STEP 236 is affirmative ("Yes" in FIG. 5/STEP 236), the route searching unit 213 determines whether or not both of the departure location and the destination location are outside the movement restriction region (FIG. 5/STEP 238). A condition that both of the departure location and the destination location are outside the movement restriction region corresponds to an "extra-region movement condition" of the present invention. Note that, instead of or in addition to the aforementioned condition, a condition that a route that joins the departure location and the destination location by only links that are outside the movement restriction region is searched for may also be adopted as the "extra-region movement condition".

If the result of the determination in FIG. 5/STEP 238 is negative ("No" in FIG. 5/STEP 238), the route searching unit 213 outputs the retrieved route to the client output apparatus 23 as the recommended route (FIG. 5/STEP 252), and starts route guidance in accordance with the recommended route (FIG. 5/STEP 254).

If the result of the determination in FIG. 5/STEP 238 is affirmative ("Yes" in FIG. 5/STEP 238), using the map information excluding restriction regions 243, the route searching unit 213 searches for at least two routes which are in accordance with the driving mode restriction rule 244 and which join the departure location and the destination location in a manner that sandwiches the movement restriction region therebetween (FIG. 5/STEP 240).

For example, in FIG. 6B, the route searching unit 213 searches for routes that are in accordance with the driving mode restriction rule 244 by performing a search in a manner so as to exclude a route R4 with respect to which it is necessary to adopt a predetermined driving mode (in this case, a right turn) at a location P that is a restriction object during a time period that is a restriction object.

More specifically, the route searching unit 213 searches for a route that is in accordance with the driving mode restriction rule 244 by evaluating the movement cost of a route along which it is necessary to adopt a driving mode that is prohibited (not allowed) with respect to a time period and a location which are restriction objects so as to be greater than the movement cost of a route along which it is not necessary to adopt a prohibited driving mode.

Further, for example, as shown in FIG. 6A, the route searching unit 213 retrieves two routes R2 and R3 that sandwich the movement restriction region A1.

The route searching unit 213 determines whether or not routes could be retrieved in FIG. 5/STEP 240 (FIG. 5/STEP 242).

If the result of the determination in FIG. 5/STEP 242 is affirmative ("Yes" in FIG. 5/STEP 242), a route which requires the shortest time among the routes that were retrieved in FIG. 5/STEP 240 is selected by the route searching unit 213 as the recommended route (FIG. 5/STEP 244).

If the result of the determination in FIG. 5/STEP 242 is negative ("No" in FIG. 5/STEP 242), the route searching unit 213 uses the map information excluding restriction regions 243 to search again for at least two routes that join the departure location and the destination location in a manner that sandwiches the movement restriction region (FIG. 5/STEP 246).

The route searching unit 213 selects a route which requires the shortest time among the routes retrieved as a result of the operation to search for routes again in FIG. 5/STEP 246 as the recommended route (FIG. 5/STEP 248).

After the processing in FIG. 5/STEP 244 or FIG. 5/STEP 248, the route searching unit 213 outputs the movement restriction region, the respective routes retrieved in FIG. 5/STEP 240 or FIG. 5/STEP 246, and the time required for each route to the client output apparatus 23 (FIG. 5/STEP 250).

Figure 7B:
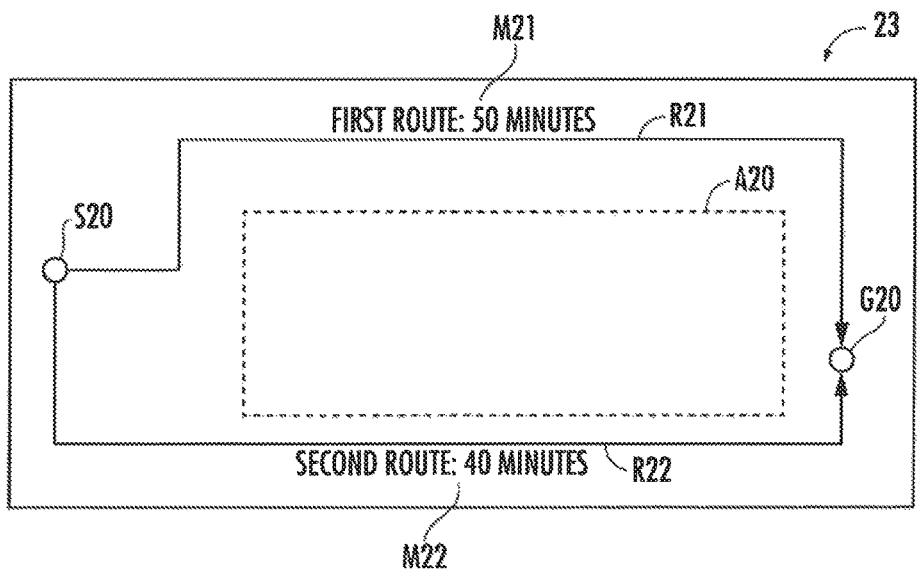
FIG. 7B is a view for describing a route in a case of avoiding a movement restriction region.

For example, as shown in FIG. 7B, the route searching unit 213 displays on the client output apparatus 23 an image that includes the departure location S20, the destination location G20, the movement restriction region A20, respective routes R21 and R22 retrieved in FIG. 5/STEP 240 or FIG. 5/STEP 246, and messages M21 and M22 that include the time required for each route.

The route searching unit 213 starts route guidance for the movable body 2 in accordance with the recommended route (FIG. 5/STEP 254).

(Working Effects of Present Embodiment)

According to the route searching system of the present embodiment, in a case where an extra-region movement condition is satisfied ("Yes" in FIG. 5/STEP 238), the route searching unit 213 is used to refer to movement restriction region information (in the present embodiment, the map information excluding restriction regions 243) and retrieve the recommended route R22 that excludes links included in the movement restriction region A20. By this means, in a case where it is possible for the movable body 2 to move from the departure location S20 to the destination location G20 by passing along only links that are outside the movement restriction region A20, the recommended route R22 that avoids the movement restriction region A20 is retrieved.

On the other hand, if the extra-region movement condition is not satisfied ("No" in FIG. 5/STEP 238), a retrieved route that includes a link included in the movement restriction region is taken as the recommended route by the route searching unit 213 (FIG. 5/STEP 232, STEP 252 and STEP 254). By this means, in a case where it is not possible for the movable body 2 to move from the departure location S10 to the destination location G10 by passing along only links that are outside the movement restriction region, that is, in a case where the movable body 2 cannot move from the departure location S10 to the destination location G10 without passing along a link inside the movement restriction region, the recommended route R10 which does not avoid the movement restriction region is retrieved.

Therefore, according to the route searching system of the present embodiment, a determination as to whether or not to avoid a movement restriction region is made in accordance with the departure location S10 and the destination location G10 of the movable body 2, and hence it is possible to appropriately search for a route.

Further, according to the route searching system of the present embodiment, when searching for a recommended route that excludes links included in a movement restriction region, since the map information excluding restriction regions 243 from which links that are included in the movement restriction region are excluded which is stored in the client storage unit 24 is used, the calculation amount is reduced and links included in the movement restriction region are reliably excluded from the recommended route.

Further, according to the route searching system having the above configuration, a recommended route is retrieved in a manner so as to exclude a predetermined driving mode at a predetermined location (FIG. 5/STEP 240). Consequently, it is possible to search for a recommended route with greater flexibility.

Since movement in a movement restriction region lasts a comparatively long time and, on the other hand, movement according to a predetermined driving mode at a predetermined location is completed in a comparatively short time, according to the route searching system having the above configuration, satisfaction of the extra-region movement condition is prioritized over the satisfaction of the driving mode restriction rule 244 (FIG. 5/STEP 240 to FIG. 5/STEP 248). By this means, since a movement time period in which a restriction is violated is comparatively short, an uncomfortable feeling that is imparted to an occupant of the movable body 2 is lessened.

According to the route searching system of the present embodiment, in a case where it is clear that the extra-region movement condition is not satisfied, such as when one or both of the departure location and the destination location are included in a movement restriction region, without performing a route search operation it is determined that the extra-region movement condition is not satisfied ("No" in FIG. 5/STEP 238). By this means, the calculation amount can be reduced when making a determination regarding the extra-region movement condition.

According to the route searching system of the present embodiment, the movement cost for a link included in an outer movement restriction region is evaluated so as to be greater than in a case where the link is not included in the outer movement restriction region (FIG. 3/STEP 212, STEP 216 and STEP 218). By this means, it is difficult for a link included in an outer movement restriction region, that is, a link included in a region that is geographically adjacent to a movement restriction region, to be included in a recommended route. In other words, the probability that a link included in a recommended route is a link in a region that is geographically separated from the movement restriction region increases.

Accordingly, in a case where the movable body 2 moves along a recommended route, because the probability that the movable body 2 is moving through a region that is geographically separated from a movement restriction region is high, even if the driver of the movable body 2 drives in a manner that deviates from the recommended route, the probability of the movable body 2 entering a movement restriction region is lowered.

Consequently, even if the driver of the movable body 2 does not follow the recommended route, the probability that the movable body 2 will move in a manner that avoids a movement restriction region increases.

According to the route searching system of the above configuration, since it is difficult for a link that is connected in a predetermined connection mode to be retrieved, by appropriately setting the predetermined connection mode, for example, it is difficult for a link from which the movable body is liable to enter a movement restriction region to be retrieved.

(Other Embodiments)

Although according to the present embodiment the client arithmetic processing apparatus 21 of the client 20 functions as the map information updating unit 211, the location recognition unit 212 and the route searching unit 213, a configuration may also be adopted in which the server arithmetic processing element 11 of the server 10 functions as a part or all of the map information updating unit 211, the location recognition unit 212 and the route searching unit 213 by executing a predetermined program and appropriately communicating with the client 20. In this case, as necessary, a part or all of the map information containing restriction regions 242, the map information excluding restriction regions 243 and the driving mode restriction rule 244 may be stored in the database 14.

What is claimed is:

1. A route searching system which searches for a recommended route of a movable body, comprising:
 a storage unit configured to store map information represented by a plurality of links and movement restriction information relating to restriction of movement of the movable body;
 a location recognition unit configured to recognize a departure location and a destination location of the movable body; and
 a route searching unit configured to determine whether or not a movement condition which is that it is possible for the movable body to move from the departure location to the destination location by moving in accordance with the movement restriction information is satisfied, and in a case where the movement condition is satisfied, to refer to the movement restriction information and search for the recommended route based on the map information so as to exclude a route that violates the movement restriction, and in a case where the movement condition is not satisfied, to search for the recommended route based on the map information including a route that violates the movement restriction.

2. The route searching system according to claim 1, wherein:
 the storage unit is configured to store, as the movement restriction information, movement restriction region information relating to a movement restriction region that is a geographical region in which movement of the movable body is restricted; and
 the route searching unit is configured to determine whether or not, as the movement condition, an extra-region movement condition which is that it is possible for the movable body to move from the departure location to the destination location by passing along only links that are outside the movement restriction region is satisfied, and in a case where the extra-region movement condition is satisfied, to refer to the movement restriction region information and search for the recommended route based on the map information so as to exclude a link that is included in the movement restriction region, and in a case where the extra-region movement condition is not satisfied, to search for the recommended route based on the map information including a link included in the movement restriction region.

3. The route searching system according to claim 2, wherein:
 the storage unit stores, as the map information, map information excluding restriction regions from which a link included in a movement restriction region is excluded, and map information containing restriction regions that includes a link included in a movement restriction region as the map information and the movement restriction region information; and
 in a case where the extra-region movement condition is satisfied, the route searching unit searches for the recommended route based on the map information excluding restriction regions so as to exclude a link included in the movement restriction region, and
 in a case where the extra-region movement condition is not satisfied, the route searching unit searches for the recommended route based on the map information containing restriction regions so as to include a link included in the movement restriction region.

4. The route searching system according to claim 2, wherein:
 the route searching unit is configured to search for a recommended route in a manner that prioritizes satisfaction of the extra-region movement condition over other movement conditions.

5. The route searching system according to claim 2, wherein:
 in a case where one or both of the departure location and the destination location are included in a movement restriction region, the route searching unit determines that the extra-region movement condition is not satisfied.

6. The route searching system according to claim 2, wherein:
 the storage unit stores an outer movement restriction region that is geographically adjacent to the movement restriction region, and
 the route searching unit evaluates a movement cost for a link included in the outer movement restriction region so as to be greater than in a case where the link is not included in the outer movement restriction region.

7. The route searching system according to claim 6, wherein:
 the route searching unit evaluates a movement cost of a link that is included in the outer movement restriction region and is connected in a predetermined connection mode to the movement restriction region so as to be greater than in a case where the link that is included in the outer movement restriction region is not connected in the predetermined connection mode.

8. The route searching system according to claim 1, wherein:
the storage unit is configured to store, as the movement restriction information, a driving mode restriction rule which restricts a predetermined driving mode by a driver of the movable body at a predetermined location; and
the route searching unit is configured to determine whether or not, as the movement condition, a rule movement condition which is that it is possible for the movable body to move from the departure location to the destination location by moving in accordance with the driving mode restriction rule is satisfied, and in a case where the rule movement condition is satisfied, to refer to the driving mode restriction rule and search for the recommended route based on the map information so as to exclude a route that violates the driving mode restriction rule, and in a case where the rule movement condition is not satisfied, to search for the recommended route based on the map information including a route that violates the driving mode restriction rule.

9. A storage medium which stores a route searching program that causes a computer having a storage unit which stores map information represented by a plurality of links and movement restriction information relating to restriction of movement of a movable body to execute:
a location recognition step of recognizing a departure location and a destination location of the movable body;
a condition determination step of determining whether or not a movement condition which is that it is possible for the movable body to move from the departure location to the destination location by moving in accordance with the movement restriction information is satisfied;
in a case where the movement condition is satisfied, an exclusive search step of referring to the movement restriction information and searching for a recommended route based on the map information so as to exclude a route that violates the movement restriction; and
in a case where the movement condition is not satisfied, an inclusive search step of searching for a recommended route based on the map information including a route that violates the movement restriction.

10. A route searching method that is a method which a computer having a storage unit which stores map information represented by a plurality of links and movement restriction information relating to restriction of movement of a movable body executes, the method comprising:
a location recognition step of recognizing a departure location and a destination location of the movable body;
a condition determination step of determining whether or not a movement condition which is that it is possible for the movable body to move from the departure location to the destination location by moving in accordance with the movement restriction information is satisfied;
in a case where the movement condition is satisfied, an exclusive search step of referring to the movement restriction information and searching for a recommended route based on the map information so as to exclude a route that violates the movement restriction; and
in a case where the movement condition is not satisfied, an inclusive search step of searching for the recommended route based on the map information including a route that violates the movement restriction.

* * * * *